Oct. 22, 1957  E. H. MUMFORD  2,810,236
MEANS FOR DIRECTING CHARGES OF MOLTEN GLASS INTO MOLDS
Filed Sept. 3, 1954  2 Sheets-Sheet 1
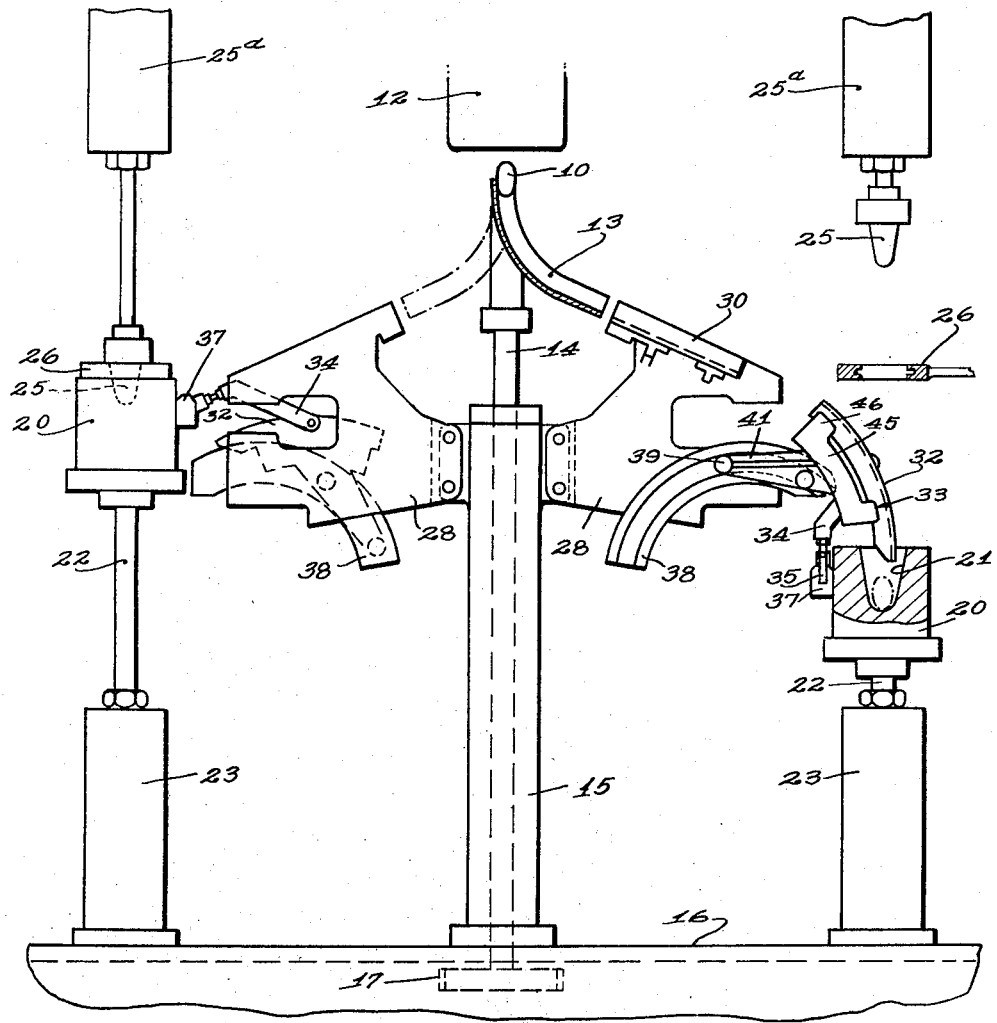
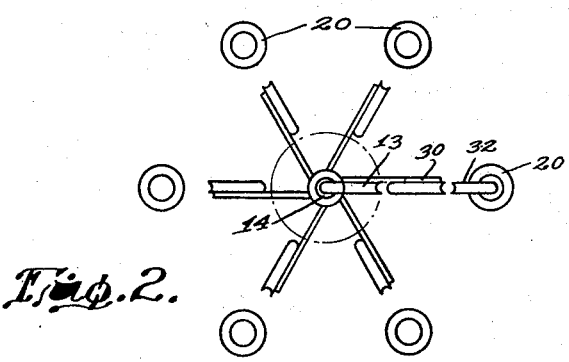
INVENTOR.
EUSTACE H. MUMFORD
BY
*Rule & Hoge*
ATTORNEYS

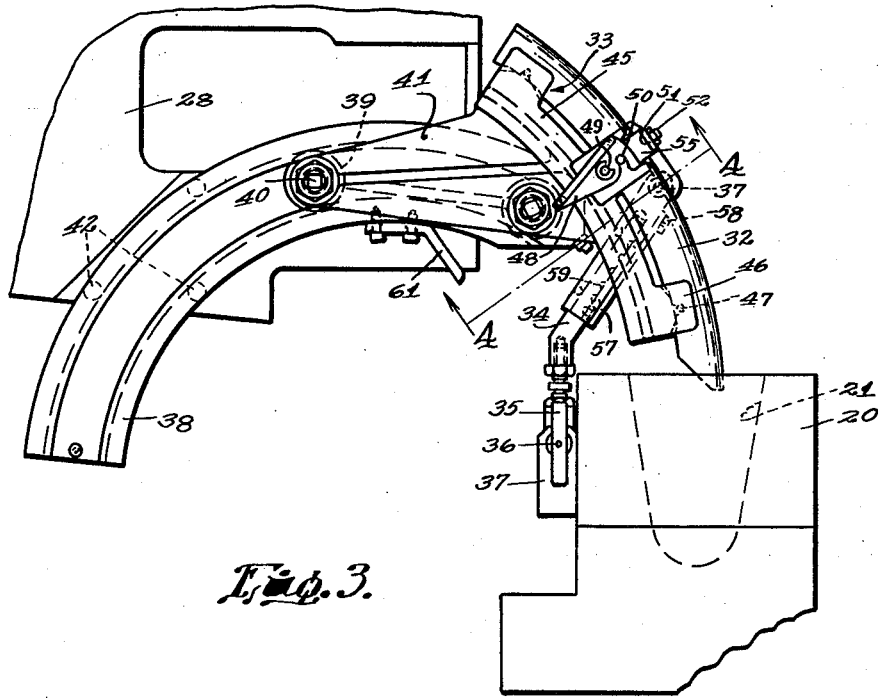

United States Patent Office 2,810,236
Patented Oct. 22, 1957

2,810,236

MEANS FOR DIRECTING CHARGES OF MOLTEN GLASS INTO MOLDS

Eustace H. Mumford, Ottawa Lake, Mich., assignor to Owens-Illinois Glass Company, a corporation of Ohio Application September 3, 1954, Serial No. 454,000

14 Claims. (Cl. 49—5)

My invention relates to apparatus for directing mold charges or gobs of molten glass, as they are discharged from a feeder, into forming molds. In the glass art it is customary to direct molten charges from a feeder downwardly through an inclined chute which extends over the open end of the mold. The molten charges move rapidly down the chute by gravity.

My invention provides a novel apparatus comprising a deflector by which the charges are accurately directed into the mold cavity. The deflector extends into the open mold cavity for positively controlling and directing the mold charge. Automatic means are provided for withdrawing the deflector and permitting the mold, neck ring and mold plunger to be brought into cooperative relation. In the illustrated form of the invention the blank mold, neck ring and plunger are brought together by an upward movement of the mold and downward movement of the plunger. A link connection between the deflector and the blank mold operates to withdraw the deflector as the mold is moved upward.

Referring to the accompanying drawings which illustrate an apparatus embodying my invention:

Fig. 1 is a part sectional elevational view of the apparatus;

Fig. 2 is a diagrammatic plan view showing a set of blank molds and the chutes through which the molten charges are directed;

Fig. 3 is an elevational view on a larger scale showing the deflector and associated parts; and Fig. 4 is a section at the line 4—4 on Fig. 3.

Referring to Fig. 1, mold charges or gobs 10 of molten glass are delivered in rapid succession from a feeder 12. The gobs 10 drop on to a chute 13. The chute is attached to a vertical drive shaft 14 which is journalled for rotation about its axis. The shaft extends through a tubular standard 15 which rises from a base 16. The shaft 14 is rotated continuously in timed relation to the movements of the molds as hereinafter set forth. Motion is transmitted to the shaft 14 through gearing including a gear wheel 17 keyed to the lower end of the shaft.

The gobs 10 are delivered in succession to blank molds 20 formed with mold cavities 21. The molds are arranged in an annular series, as shown in Fig. 2, with the molds equally spaced from each other and from the axis of the shaft 14. The blank molds 20 are mounted on plungers 22 of hydraulic motors 23 for periodically lifting and lowering the molds. Mounted above each blank mold 20 is a mold plunger 25 in vertical alignment with the mold. The plunger is operated by a hydraulic motor 25ª. Stationary neck rings 26 are positioned between and in vertical alignment with the molds and plungers. When the mold is moved upward to match with the neck ring the plunger is lowered and enters the mold cavity for molding the parison.

Attached to the standard 15 are vertical plates or wings 28 individual to the molds 20 and disposed in planes radial to the shaft 14. Each wing 28 has mounted thereon a chute section 30 which is downwardly and outwardly inclined. The chute 13 is brought into alignment with chute sections 30 in succession by the rotation of the carrier shaft 14. The rotation of the chute 13 is synchronized with the operation of the gob feeder mechanism and timed to deliver a gob 10 to each stationary chute section 30 while the chute 13 is in register therewith.

Each of the wings 28 carries a deflector 32 for deflecting the gobs 10 as they are delivered from the chute 30 and directing them into the mold cavity. The deflector is then withdrawn to permit the mold to be projected upwardly. The deflector 32 is arc-shaped for directing the mold charge in a curved path such that it is moving vertically downward as it enters the mold cavity. The deflector as shown in Fig. 4 is in the form of an inverted trough. The deflector 32 is attached to a carrier 33.

The means for withdrawing the deflector when the mold 20 is moved upward comprises a link 34 adjustably connected at its lower end to a connector rod 35. The rod is pivotally connected at 36 to a blank mold gauge 37. The gauge moves up and down as a unit with the mold 20. The upper end of the link 34 is connected by a pivot pin 37 to the carrier 33. The deflector is guided in its movements by an arc-shaped track 38 which is attached by bolts 42 to the wing 28. Ball bearings 39 which run in the track 38 are mounted on shafts 40 (Fig. 4) is attached to a horizontally disposed arm 41 which is an integral part of the carrier 33.

The deflector 32 is removably attached to the carrier 33. The latter is formed with an arc-shaped section 45 having wings or projections 46 at each end, between which the deflector 32 is held. The deflector is formed with notches to fit over pins 47 secured to the parts 46 for holding the deflector against lengthwise movement. The deflector is held on the section 45 by a leaf spring holder 51 carrying a lug 52 which bears on the deflector. The holder 51 is connected at one end by a pivot 53 to the carrier 33. The holder 51 is latched in holding position by a latch 48 which swings about a pivot pin 49 attached to the carrier 33 and is notched to engage a pin 50 or an arm 55 on the holder 51.

The apparatus is provided with a safety means to permit the deflector 32 to yield upwardly if its downward movement into the mold cavity is obstructed. This may take place if a mold charge sticks to the mold, owing to overheating of the mold, so that a number of mold charges accumulate in the mold cavity. To permit the deflector to yield upwardly the link 34 is made in telescoping sections. The outer section carries a leaf spring 57 attached by a screw 58 to the link. A detent on said spring engages notches 59 on the inner section of the link. A stop plate 61 attached to the track 38 limits the swinging movement of the link 34 when the deflector 32 has been detached.

In operation the mold charges 10 are discharged in succession from the feeder 12. The shaft 14 and the trough 13 attached thereto are rotating continuously about the axis of the shaft, at such speed that each gob is directed into a trough section 30. The gob in its descent jumps the space between the trough 30 and the deflector 32 and is guided by the deflector into the mold. Immediately after receiving its charge the blank mold is moved upward by the motor 23, bringing blank mold into register with the neck ring 26. This upward movement of the blank mold operates through the link 34 to swing the deflector 32 out of the path of the mold. This permits the mold to be brought up to the neck ring 26 and the plunger 25 moves downward into the mold cavity for forming the blank.

Modifications may be resorted to within the spirit and scope of my invention.

I claim:

1. A hollow mold open at its upper end to receive mold charges of molten glass, means for reciprocating the mold and thereby moving it into and out of a charge receiving position, a guide, means for supporting said guide in an operative position with the guide above and extending over the mold, means for directing mold charges to said guide, the guide having a guiding surface by which the charges are guided into the mold, and automatic means comprising a link between the guide and mold and operable by movement of the mold out of charge receiving position to withdraw the guide to a position at one side of the mold and operable by the return movement of the mold to charge receiving position to return the guide to said operative position.

2. The combination of a hollow mold open at its upper end to receive mold charges, means for periodically delivering mold charges to a position above and at one side of the mold, a guide having a downwardly inclined guiding surface extending over the mold cavity, said guide positioned to receive the mold charges and guide them into the mold, means for moving the mold upwardly after each mold charge is received therein and automatic means for withdrawing the guide to one side of the mold after each delivery of a mold charge to the mold cavity, said means for withdrawing the guide being operatively connected to the mold and operated by the upward movement of the mold.

3. The combination of a mold open at its upper end to receive a mold charge, a feeder by which mold charges are delivered at a point above and at one side of the mold, a downwardly inclined chute positioned above and at one side of the mold to which the mold charges are delivered, a deflector interposed between the chute and the mold, said deflector extending over the mold and positioned to guide the mold charges into the mold cavity, means for lifting the mold, and automatic means actuated by the lifting of the mold for withdrawing the deflector to one side of the mold after a mold charge is delivered to the mold.

4. The combination of a hollow mold open at its upper end for receiving mold charges, automatic means for moving the mold into and out of a charge receiving position, means for guiding mold charges into the mold comprising a guide having an inclined guiding surface the lower end of which is positioned over the mold cavity, means for directing mold charges of molten glass in succession to said guiding surface and thereby directing the charges into the mold cavity, and automatic means comprising a link having pivotal connections at its opposite ends to the said guide and mold respectively and operative by the movement of the mold out of said charge receiving position to withdraw said guide laterally to a position at one side of the mold after each delivery of a charge to the mold and operative through said link to return the guide to operative position over the mold when the mold is returned to charge receiving position.

5. The combination of a hollow mold open at its upper end, means for guiding mold charges into the mold comprising a guide having an inclined guiding surface the lower end of which is positioned over the mold cavity, means for directing mold charges of molten glass in succession to said guiding surface and thereby directing the charges into the mold cavity, and automatic means for withdrawing said guide laterally to a position at one side of the mold after each delivery of a charge to the mold, means for lifting the mold after a mold charge is delivered thereto, said means for withdrawing the guide having operating connection with the mold and actuated by the upward movement of the mold.

6. The combination of a blank mold open at its upper end to receive mold charges, means for forming and delivering mold charges in succession to the mold, said means including a deflector extending over the mold and having an inclined guiding surface along which the mold charges travel and by which they are directed into the mold cavity, means for lifting the mold after a charge of glass has entered the mold cavity, and automatic means operatively connected to the mold and operated by the upward movement of the mold to withdraw the deflector to a position at one side of the mold.

7. The apparatus defined in claim 6, said means for withdrawing the deflector including a link connecting the deflector with the mold, a stationary track, and means carried with said deflector and running on said track for guiding the deflector to its retracted position.

8. The apparatus defined in claim 7, said deflector being in the form of an inverted trough and having its lower end extended downward at least to the open end of the mold, for positively guiding the mold charges into the mold.

9. The combination of a blank mold with a mold cavity opening through the upper end of the mold, a mold plunger positioned above and in vertical alignment with the mold cavity, means for relatively moving the mold and plunger vertically from a gob receiving position in which mold and plunger are spaced apart vertically to a position in which the plunger is projected into the mold cavity for forming a blank therein, a deflector for deflecting and guiding gobs of molten glass into the mold, said deflector being mounted for movement from an operative position in which the discharge end of the deflector is directly over the mold cavity, and means for retracting said deflector to a position at one side of the mold and plunger, thereby permitting the said relative movement for bringing the plunger into the mold cavity, said means for retracting the deflector comprising a link connecting the mold with the deflector for moving the latter upwardly as the mold is moved upwardly, a stationary track extending laterally with respect to the mold, a roll running on said track and connected to the deflector for swinging the latter latterly away from the path of the mold as it is moved upwardly by said upward movement of the mold.

10. The apparatus defined in claim 9, said deflector being in the form of an inverted trough and being arc-shaped in the direction of its length.

11. The combination of a hollow blank mold open at its upper end, means for moving the mold up and down vertically, a deflector positioned above the mold and having an inclined guiding surface extending from a position above and at one side of the mold to a discharge position at the upper end of the mold cavity, means for moving the mold upwardly from a charge receiving position, a link forming a connection between the mold and the deflector, a stationary track having a guiding surface extending laterally away from the mold, and means connected to the deflector and running in said track for guiding the deflector to one side of the path of the mold as it is lifted by the upward movement of the mold.

12. The apparatus defined in claim 11, the means running on said track comprising rolls connected to the deflector and running on said track, the rolls being spaced lengthwise of the track.

13. The apparatus defined in claim 11, said track being curved outwardly and downwardly in a direction extending away from the mold.

14. The apparatus defined in claim 11, the said deflector having its lower end protruding into the mold while in its operative position, said link comprising sections relatively movable lengthwise to provide an extensible link, and means for yieldingly holding said sections against said relative movement.

References Cited in the file of this patent

UNITED STATES PATENTS

| | | |
|---|---|---|
| 1,314,691 | Netter | Sept. 2, 1919 |
| 1,982,103 | Hiller | Nov. 27, 1934 |
| 2,165,985 | Schwentler | July 11, 1939 |
| 2,267,236 | Goodrich | Dec. 23, 1941 |